US012614033B2

(12) United States Patent
Adel-Vu et al.

(10) Patent No.: US 12,614,033 B2
(45) Date of Patent: Apr. 28, 2026

(54) DEVICE AND COMPUTER-IMPLEMENTED METHOD FOR OPERATING A KNOWLEDGE BASE COMPRISING A LANGUAGE MODEL

(71) Applicant: Robert Bosch GmbH, Stuttgart (DE)

(72) Inventors: Heike Adel-Vu, Renningen (DE); Jun Araki, San Jose, CA (US); Koustava Goswami, Galway (IE); Lukas Lange, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 163 days.

(21) Appl. No.: 18/406,478

(22) Filed: Jan. 8, 2024

(65) Prior Publication Data

US 2024/0242028 A1 Jul. 18, 2024

(30) Foreign Application Priority Data

Jan. 18, 2023 (DE) ..................... 10 2023 200 347.3

(51) Int. Cl.
G06F 40/284 (2020.01)
G06F 16/31 (2019.01)
G06F 40/40 (2020.01)

(52) U.S. Cl.
CPC .......... G06F 40/284 (2020.01); G06F 16/319 (2019.01); G06F 40/40 (2020.01)

(58) Field of Classification Search
CPC ............................ G06F 40/284; G06F 16/319
See application file for complete search history.

(56) References Cited

U.S. PATENT DOCUMENTS

| | | | | |
|---|---|---|---|---|
| 11,042,700 | B1 * | 6/2021 | Walters ................. | G06N 3/096 |
| 2022/0222437 | A1 * | 7/2022 | Lauber ................. | G06N 3/0499 |
| 2024/0054179 | A1 * | 2/2024 | Elyasi ................. | G06F 12/0842 |
| 2024/0054552 | A1 * | 2/2024 | Fu ...................... | G06Q 30/0641 |
| 2024/0111794 | A1 * | 4/2024 | Osuala ............... | G06F 16/3323 |
| 2024/0242028 | A1 * | 7/2024 | Adel-Vu .............. | G06F 16/319 |

(Continued)

OTHER PUBLICATIONS

Li, Xiang & Liang, Percy, Prefix-Tuning: Optimizing Continuous Prompts for Generation, Jan. 1, 2021 (Year: 2021).*

(Continued)

*Primary Examiner* — Kevin Ky
(74) *Attorney, Agent, or Firm* — NORTON ROSE FULBRIGHT US LLP

(57) ABSTRACT

A device and computer implemented method for operating a knowledge base including a language model. The language model is pre-trained for a first domain and comprises a tokenizer and a transformer. The method includes providing an input sentence of a second domain, tokenizing the input sentence with the tokenizer into tokens, transforming the tokens with the transformer to a sentence embedding, providing a first set of embeddings that represent a prompt of the first domain, providing a second set of embeddings, wherein the second set of embeddings comprises the first set of embeddings and a set of embeddings that represent keywords of the second domain, determining a prompt depending on the first set of embeddings and the second set of embeddings, transforming at least one of the tokens and the prompt with the transformer to an output of the knowledge base.

12 Claims, 3 Drawing Sheets

(56)          References Cited

U.S. PATENT DOCUMENTS

| | | | |
|---|---|---|---|
| 2025/0245445 A1* | 7/2025 | Hitesh | G06F 40/295 |
| 2025/0252254 A1* | 8/2025 | Gao | H04M 3/5175 |
| 2025/0252554 A1* | 8/2025 | He | G06T 5/77 |

OTHER PUBLICATIONS

Liu, Xiao et al., P-Tuning v2: Prompt Tuning Can Be Comparable to Fine-tuning Universally Across Scales and Tasks, Mar. 20, 2022 (Year: 2022).*

Bishop, Christopher M.: "Pattern Recognition and Machine Learning," (2006), Springer, Ch. 14. Combining Models, pp. 1-20.

Lester, et al.: "The Power of Scale for Parameter-Efficient Prompt Tuning," arXiv:2104.08691, (2021), pp. 1-15.

Gao et al., "Making Pre-Trained Language Models Better Few-Shot Learners," Proceedings of the 59th Annual Meeting of the Association for Computational Linguistics and the 11th International Joint Conference on Natural Language Processing, vol. 1, 2021, pp. 3816-3830. <https://aclanthology.org/2021.acl-long.295.pdf> Downloaded Jan. 5, 2024.

Liu et al., "P-Tuning: Prompt Tuning Can be Comparable to Fine-Tuning Across Scales and Tasks," Proceedings of the 60th Annual Meeting of the Association for Computational Linguistics, vol. 2, 2022, pp. 61-68. <https://aclanthology.org/2022.acl-short.8.pdf> Downloaded Jan. 5, 2024.

Qin et al., "LFPT5: A Unified Framework for Lifelong Few-Shot Language Learning Based on Prompt Tuning of T5," International Conference on Learning Representations (ICLR), 2022, pp. 1-15.

\* cited by examiner

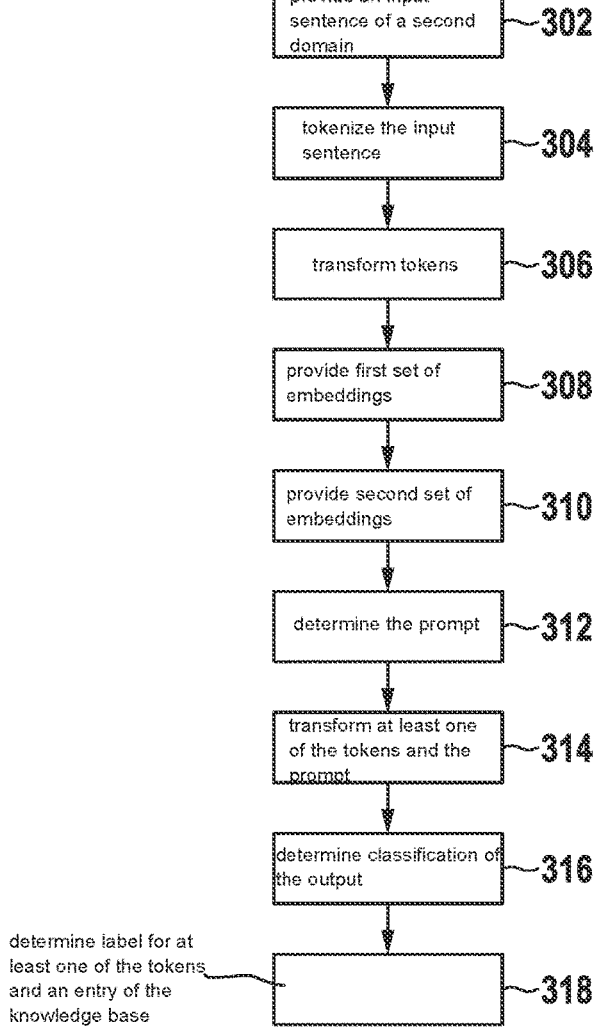

provide an input
sentence of a second
domain — 302 tokenize the input
sentence — 304 transform tokens — 306 provide first set of
embeddings — 308 provide second set of
embeddings — 310 determine the prompt — 312 transform at least one
of the tokens and the
prompt — 314 determine classification of
the output — 316 determine label for at
least one of the tokens
and an entry of the
knowledge base — 318

Fig. 3

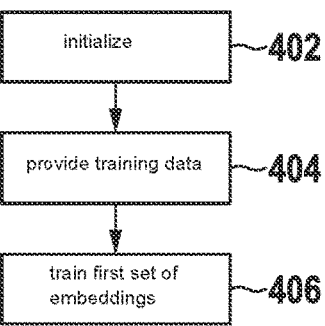

initialize — 402 provide training data — 404 train first set of
embeddings — 406

Fig. 4

DEVICE AND COMPUTER-IMPLEMENTED METHOD FOR OPERATING A KNOWLEDGE BASE COMPRISING A LANGUAGE MODEL

CROSS REFERENCE

The present application claims the benefit under 35 U.S.C. § 119 of German Patent Application No. DE 10 2023 200 347.3 filed on Jan. 18, 2023, which is expressly incorporated herein by reference in its entirety.

FIELD

The present invention relates to a device and a computer-implemented method for operating a knowledge base comprising a language model.

BACKGROUND INFORMATION

Pre-trained language models may be used with prompts in order to provide answers to the prompts.

Gao, Tianyu, Adam Fisch, and Danqi Chen. "Making Pre-trained Language Models Better Few-shot Learners." Proceedings of the 59th Annual Meeting of the Association for Computational Linguistics and the 11th International Joint Conference on Natural Language Processing (Volume 1: Long Papers), 2021 and Liu, Xiao, et al. "P-Tuning: Prompt Tuning Can Be Comparable to Fine-tuning Across Scales and Tasks." Proceedings of the 60th Annual Meeting of the Association for Computational Linguistics (Volume 2: Short Papers), 2022 described using a hard prompt or a soft prompt for this purpose.

However, both methods are not tailored towards domain-specific settings, thus, they require domain specific pre-trained language models (PLMs) to work well on domain-specific texts and information extraction tasks. Such domain-specific PLMs might be hard to obtain though since it might be hard to find enough domain-specific data for pre-training them.

SUMMARY

A device and a computer-implemented method for operating a knowledge base comprising a language model according to features of the present invention are able to dynamically adapt general-domain PLMs to a specific domain.

According to an example embodiment of the present invention, in the method for operating the knowledge base comprising the language model, the language model is pre-trained for a first domain and comprises a tokenizer and a transformer. The method comprises providing an input sentence of a second domain, tokenizing the input sentence with the tokenizer into tokens, transforming the tokens with the transformer to a sentence embedding, providing a first set of embeddings that represent a prompt of the first domain, providing a second set of embeddings, wherein the second set of embeddings comprises the first set of embeddings and a set of embeddings that represent keywords of the second domain, determining a prompt depending on the first set of embeddings and the second set of embeddings, transforming at least one of the tokens and the prompt with the transformer to an output of the knowledge base. The prompt is a soft prompt, e.g. a sequence of vectors. The method extends the soft prompt with a sequence of vectors associated with domain-specific keywords. This allows prompting general-domain PLMs for domain-specific knowledge more effectively. Operating the knowledge base this way reduces the resource consumption because this knowledge base requires no storage for an additional pre-trained language model for the second domain. This allows using the language model that is pre-trained for the first domain for the second domain or further domains without any additional pre-trained language models.

In one embodiment of the present invention, the knowledge base comprises a classifier, wherein the method comprises determining a classification of the output with the classifier, and determining a label for at least one of the tokens depending on the classification, or determining an entry of the knowledge base, in particular a knowledge graph, that corresponds to at least one of the tokens depending on the classification in particular depending on the label for the at least one of the tokens, or determining a relation of at least two of the tokens depending on the classification. This corresponds to performing a token classification, or an entity extraction for a knowledge base population or a relation classification for the second domain based on the language model pre-trained for the first domain without requiring an additional language model of the second domain.

According to an example embodiment of the present invention, determining the prompt may comprise determining a sum of the first set of embeddings and the second set of embeddings. This allows considering the embeddings representing the keywords efficiently.

According to an example embodiment of the present invention, determining the sum may comprise weighting the first set of embeddings with a first weight and/or weighting the second set of embeddings with a second weight. This allows influencing the impact of the keywords for the second domain in relation to the impact of the embeddings of the first domain.

According to an example embodiment of the present invention, the method may comprise determining the first weight depending on the sentence embedding and/or determining the second weight depending on the sentence embedding. This adjusts these weights deepening on the input sentence and leads to a better result of the output with respect to the second domain.

Determining the first weight may comprise weighting the sentence embedding with a first weighting factor. The first weighting factor allows adjusting the weighting.

Providing the second set of embeddings may comprise determining an order of the first set of embeddings and the set of embeddings that represent keywords. This allows adjusting the order to improve the result of the output with respect to the second domain.

Determining the order may comprise arranging the first set of embeddings before the set of embeddings that represent keywords, and/or arranging the first set of embeddings after the set of embeddings that represent keywords. Computationally, this is a very efficient way of adjusting the order to improve the result of the output with respect to the second domain. This saves computing resources and allows using the language model in a device with limited computing resources, e.g. an embedded device.

Determining the second set of embeddings may comprise determining a weighted sum of the first set of embeddings arranged before the set of embeddings that represent keywords and the first set of embeddings arranged after the set of embeddings that represent keywords. Determining the order may comprise determining a second weight depending on the sentence embedding, determining if the second weight meets a condition, and either arranging the first set of embeddings before the set of embeddings that represent keywords if the second weight meets the condition, or arranging the first set of embeddings after the set of embeddings that represent keywords otherwise. This adjusts order depending on the input sentence and leads to a better result of the output with respect to the second domain.

Determining the second weight may comprise weighting the sentence embedding with a second weighting factor. The second weighting factor allows adjusting the weighting.

According to an example embodiment of the present invention, for training, the method may comprise initializing the first set of embeddings, the set of embeddings that represent keywords, the first weighting factor and/or the second weighting factor in particular randomly from a uniform distribution, providing training data for training the first set of embeddings, the set of embeddings that represent keywords, the first weighting factor and/or the second weighting factor, and training the first set of embeddings, the set of embeddings that represent keywords, the first weighting factor and/or the second weighting factor in particular while keeping the language model static. This is a very resource efficient training.

Providing the second set of embeddings may comprise determining the set of embeddings that represent keywords depending on their respective term frequency in a document of the second domain and/or their respective inverse term frequency in a set of documents of the second domain and/or their respective term frequency in a document of the first domain.

According to an example embodiment of the present invention, the device for operating the knowledge base that comprises a language model, wherein the language model is pre-trained for a first domain and comprises a tokenizer and a transformer, comprises at least one processor and at least one in particular non-transitory storage, wherein the at least one processor is configured to process instructions that, when executed by the at least one processor, cause the at least one processor to execute steps of the method according to the present invention, wherein the at least one storage is configured to store the instructions and the knowledge base. This device has advantages that correspond to the advantages of the method.

According to an example embodiment of the present invention, a computer program for operating a knowledge base comprising a language model that is pre-trained for a first domain, comprises computer readable instructions that, when executed by a computer, cause the computer to execute the method according to the present invention. This program has advantages that correspond to the advantages of the method of the present invention.

Further embodiments are derived from the following description and the figures.

BRIEF DESCRIPTION OF THE DRAWINGS

FIG. 3 depicts a flow chart comprising steps of a method for operating the knowledge base, according to an example embodiment of the present invention.

FIG. 4 depicts a flow chart comprising steps of the method for training the knowledge base, according to an example embodiment of the present invention.

DETAILED DESCRIPTION OF EXAMPLE EMBODIMENTS

Figure 1:
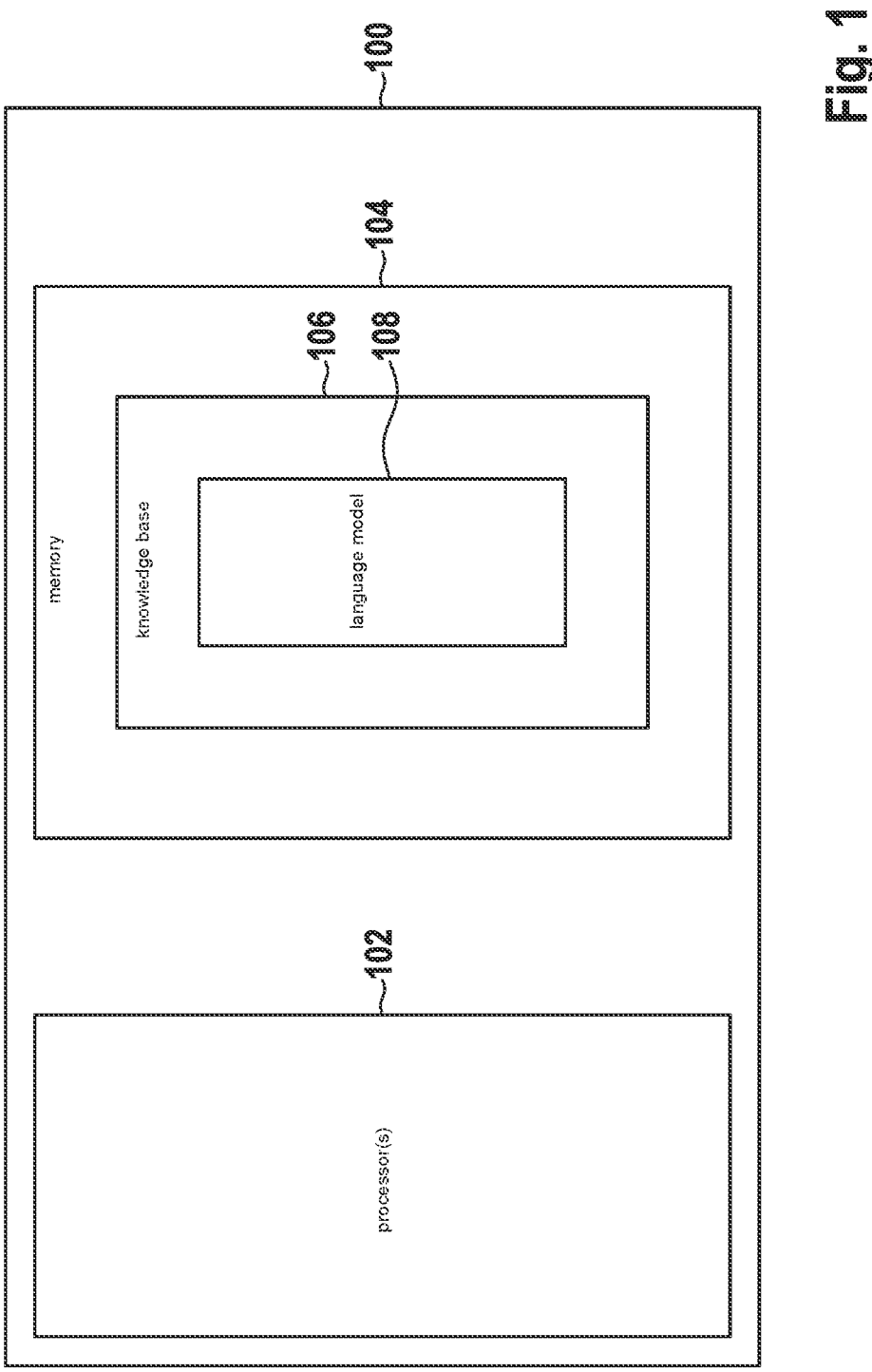
FIG. 1 schematically depicts a device for operating a knowledge base comprising a language model, according to an example embodiment of the present invention.

FIG. 1 schematically depicts a device 100. The device 100 comprises at least one processor 102 and at least one memory 104. The device 100 comprises a knowledge base 106. The knowledge base 106 comprises a language model 108. The language model 108 is pre-trained for a first domain. In the example, the first domain is a general domain. General in this context may mean that the content of text of the general domain is not limited to a certain specific topic. Specific topic in this context may mean, that content of text regarding the specific topic is text is within a technical field. An example for a specific topic is material science.

The at least one processor 102 is configured to process instructions. The at least one storage 104 is configured to store the instructions. The at least one storage 104 is configured to store the knowledge base 106 and the language model 108.

The language model 108 may be a transformed-based masked language model, e.g. BERT as described in Devlin et al.: BERT: Pre-training of Deep Bidirectional Transformers for Language Understanding. NAACL 2019.

Figure 2:
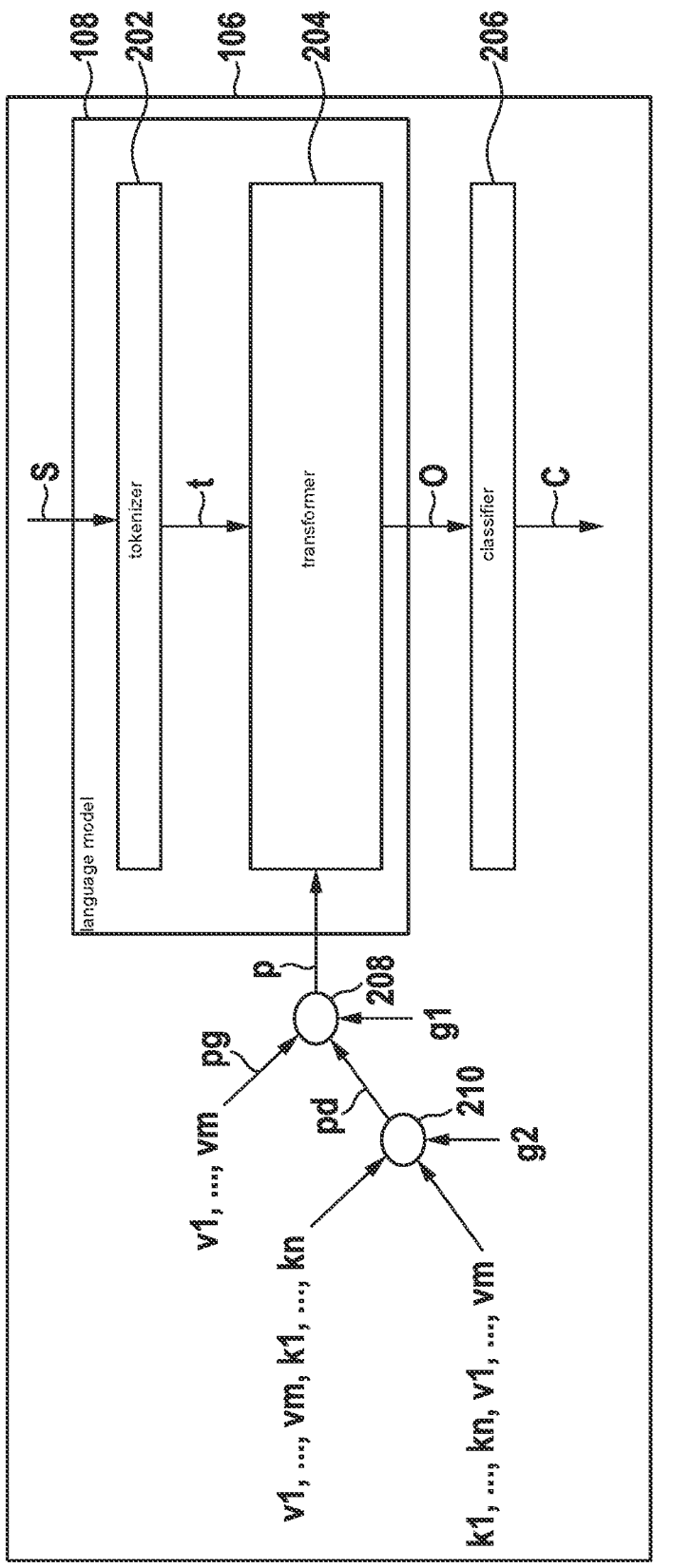
FIG. 2 schematically depicts the knowledge base, according to an example embodiment of the present invention.

FIG. 2 schematically depicts the knowledge base 106.

The language model 108 comprises a tokenizer 202 and a transformer 204.

The tokenizer 202 is configured to determine tokens t. The tokens t may comprise a classification token, CLS.

The transformer 204 is configured to determine an output o of the knowledge base 106 depending on at least one of the tokens t and a prompt p. The transformer 204 may be configured to determine the output depending on the classification token, CLS.

The knowledge base 106 optionally comprises a classifier 206. The classifier 206 is configured to determine a classification c for the output o.

The knowledge base 106 comprises a first gate 208 and a second gate 210.

The first gate 208 is configured to receive a first set of embeddings $$pg = v1, \ldots, vm$$

that represent a prompt pg of a general domain.

The first gate 208 is configured to receive a second set of embeddings pd.

The first gate 208 is configured to output the prompt p.

The first gate 208 is configured in one embodiment to switch between output of the first set of embeddings pg, i.e. p=pg, and output of the second set of embedding pd, i.e. p=pd.

The first gate 208 is in one embodiment configured to switch depending on the first weight g1 to output either p=pg or p=pd.

The first gate 208 is configured in one embodiment to determine the output prompt p depending on the first set of embeddings pg and the second set of embedding pd.

The first gate 208 is for example configured to determine the prompt p depending on the first weight g1:

$$p = g1 \ pg + (1 - g1)pd$$

The second gate 210 is configured to provide the second set of embeddings pd depending on a second weight g2.

The second gate 210 is configured in one embodiment to switch depending on the second weight g2 to output either $$pd = v1, \ldots, vm, k1, \ldots, kn$$

or $$pd = k1, \ldots, kn, v1, \ldots, vm$$

The second gate 210 is for example configured to determine the second set of embeddings pd depending on the second weight g2:

$$pd = g2 \ (v1, \ldots, vm, k1, \ldots, kn) + (1 - g2) \ (k1, \ldots, kn, v1, \ldots, vm)$$

According to one example, the knowledge base 106 comprises knowledge graph.

The knowledge graph is for example based on disjoint sets N_C, N_P, N_I wherein N_C is a set that comprises class names, N_P is a set that comprises property names and N_E is a set that comprises entity names. The knowledge graph for example comprises facts. The facts are for example binary triples of the form C(s) and p(s, o), where $C \in N\_C$, p (s, o) $\in$ N_P and s, o $\in$ N_E.

The set N_C comprises for example more than 100, more than 1000, more than 10000 or more than 100000 class names. The set N_P comprises for example more than 100, more than 1000, more than 10000 or more than 100000 property names. The set N_E comprises for example more than 100, more than 1000, more than 10000 or more than 100000 entity names. The sets N_C, N_P, N_E may comprise thousands or millions of class names, property names and entity names respectively.

The at least one processor 102 is configured to process instructions that, when executed by the at least one processor 102, cause the at least one processor 102 to execute steps of a computer implemented method for operating the knowledge base 106.

The at least one storage 104 is configured to store the instructions and the knowledge base 106.

A computer program for operating the knowledge base 106 comprises computer readable instructions that, when executed by a computer, e.g. comprising the at least one processor 102, cause the computer to execute the method.

FIG. 3 depicts steps of the method.

The computer-implemented method comprises a step 302.

Step 302 comprises providing an input sentence s of a second domain. The second domain is different from the first domain. In the example, the second domain is a specific domain, i.e. related to a specific topic, e.g. material science.

The method comprises a step 304.

Step 304 comprises tokenizing the input sentence s with the tokenizer 202 into tokens t.

The method comprises a step 306.

Step 306 comprises transforming the tokens t with the transformer 204 to a sentence embedding Ss.

The method comprises a step 308.

Step 308 comprises providing the first set of embeddings pg that represent a prompt of the first domain.

The method comprises a step 310.

Step 310 comprises providing the second set of embeddings pd.

The second set of embeddings pd comprises the first set of embeddings pg and the set of embeddings k1, . . . , kn that represent keywords of the second domain.

The set of embeddings that represent keywords k1, . . . , kn may be determined depending on their respective term frequency in a document of the second domain. The set of embeddings that represent keywords k1, . . . , kn may be determined depending on their respective inverse term frequency in a set of documents of the second domain. The set of embeddings that represent keywords k1, . . . , kn may be determined depending on their respective term frequency in a document of the first domain.

Providing the second set of embeddings pd in one example comprises determining an order of the first set of embeddings pg and the set of embeddings k1, . . . , kn that represent keywords within the second set of embeddings pd.

Determining the order may comprise arranging the first set of embeddings pg=v1, . . . , vm before the set of embeddings that represent keywords k1, . . . , kn.

Determining the order may comprise arranging the first set of embeddings pg=v1, . . . , vm after the set of embeddings that represent keywords k1, . . . , kn.

Determining the order may comprise determining if the second weight g2 meets a condition, and either arranging the first set of embeddings pg=v1, . . . , vm before the set of embeddings that represent keywords k1, . . . , kn if the second weight g2 meets the condition, or arranging the first set of embeddings pg=v1, . . . , vm after the set of embeddings that represent keywords k1, . . . , kn otherwise.

In one embodiment, the set of embeddings pd is provided as weighted sum of the first set of embeddings pg=v1, . . . , vm arranged before the set of embeddings that represent keywords k1, . . . , kn and the first set of embeddings pg=v1, . . . , vm arranged after the set of embeddings that represent keywords k1, . . . , kn:

$$pd = g2 \ (v1, \ldots, vm, k1, \ldots, kn) + (1 - g2) \ (k1, \ldots, kn, v1, \ldots, vm)$$

In one example, the second weight g2 is determined depending on the sentence embedding Ss. For example, the second weight g2 is determined with a second weighting factor Wd:

$$g2 = \sigma(Wd \ Ss)$$

wherein $\sigma$ is the sigmoid function to keep the second weight g2 within the range of 0 to 1. The sigmoid function is optional.

Determining the prompt p may comprise determining a sum of the first set of embeddings pg and the second set of embeddings pd. Determining the sum may comprise weighting the first set of embeddings pg with the first weight g1. Determining the sum may comprise weighting the second set of embeddings pd with depending on the first weight, e.g. with 1−g1. According to one example, the prompt p is determined as $$p = g1 \ pg + (1 - g1)pd$$

In one example, the first weight g1 is determined depending on the sentence embedding Ss. For example, the first weight g1 is determined with a first weighting factor Wg:

$$g1 = \sigma(Wg\ Ss)$$

wherein σ is the sigmoid function to keep the first weight g1 within the range of 0 to 1. The sigmoid function is optional.

The method comprises a step 312.

Step 312 comprises determining the prompt p depending on the first set of embeddings pg and the second set of embeddings pd.

The method comprises a step 314.

Step 314 comprises transforming at least one of the tokens t and the prompt p with the transformer 204 to the output o of the knowledge base 106.

Optionally, the method may comprise a step 316.

The step 316 comprises determining the classification c of the output o with the classifier 206.

Optionally, the method comprises a step 318.

The step 318 comprises in one embodiment determining a label for at least one of the tokens t depending on the classification c.

The step 318 comprises in one embodiment determining an entry of the knowledge base 106 that corresponds to at least one of the tokens t depending on the classification c.

For example, the entry for the knowledge graph that corresponds to at least one of the tokens t is determined depending on the classification c. For example, the entry is determined depending on the label for the at least one of the tokens t.

The step 318 comprises in one embodiment determining a relation of at least two of the tokens t depending on the classification c.

FIG. 4 depicts steps of the method for training.

The method comprises a step 402.

The step 402 comprises initializing the first set of embeddings pg, e.g. vectors v1, . . . , vm.

The step 402 comprises initializing set of embeddings that represent keywords, e.g. vectors k1, . . . , kn.

The step 402 comprises initializing the first weighting factor, e.g. a matrix Wg.

The step 402 comprises initializing the second weighting factor, e.g. a matrix Wd.

The vectors or matrices are for example initialized randomly, e.g. from a uniform distribution.

The method comprises a step 404.

The step 404 comprises providing training data.

The method comprises a step 406.

The step 406 comprises training the first set of embeddings pg=v1, . . . , vm, the set of embeddings that represent keywords k1, . . . , kn, the first weighting factor Wg and/or the second weighting factor Wd in particular while keeping the language model 204 static.

The training uses m and n as hyperparameters. These may be learned as well.

Afterwards, the method may continue with step 302.

What is claimed is:

1. A computer-implemented method for operating a knowledge base including a language model, wherein the language model is pre-trained for a first domain and includes a tokenizer and a transformer, the method comprising the following steps:

providing an input sentence of a second domain;

tokenizing the input sentence with the tokenizer into tokens;

determining, by the transformer, respective embeddings for the individual tokens of the input sentence;

transforming the tokens with the transformer to a sentence embedding representing the input sentence as a whole;

identifying the input sentence as belonging to the second domain;

selecting, based on the identification, a set of keywords of the second domain;

providing a first set of embeddings that includes:
  a prompt embedding of the first domain; and
  the respective embeddings of the individual tokens of the input sentence;

providing a second set of embeddings that includes:
  the first set of embeddings; and
  a set of embeddings that represent the selected keywords of the second domain;

determining, based on the sentence embedding, a respective weight for the first set of embeddings and a respective weight for the second set of embeddings;

blending the first set of embeddings and the second set of embeddings according to the respective weights to determine a blended prompt; and transforming, with the transformer, at least one of the tokens and the blended prompt to an output of the knowledge base.

2. The method according to claim 1, wherein the knowledge base includes a classifier, wherein the method further comprise:

determining a classification of the output with the classifier, and:

determining a label for at least one of the tokens depending on the classification, or determining an entry of the knowledge base that corresponds to at least one of the tokens depending on the classification for the at least one of the tokens, or determining a relation of at least two of the tokens depending on the classification.

3. The method according to claim 1, wherein the blending includes determining a sum, the weighted first set of embeddings and the weighted second set of embeddings being terms of the sum.

4. The method according to claim 1, wherein the determining of the first weight includes weighting the sentence embedding with a first weighting factor.

5. The method according to claim 4, further comprising:

initializing the first set of embeddings, and/or the set of embeddings that represent the selected keywords, and/or the first weighting factor randomly from a uniform distribution;

providing training data for training the first set of embeddings, the set of embeddings that represent the selected keywords and/or the first weighting factor; and training the first set of embeddings, and/or the set of embeddings that represent the selected keywords and/or the first weighting factor while keeping the language model static.

6. The method according to claim 1, wherein the providing the second set of embeddings includes determining an order of the first set of embeddings and the set of embeddings that represent the selected keywords.

7. The method according to claim 6, wherein the determining of the order includes: (i) arranging the first set of embeddings before the set of embeddings that represent the selected keywords, and/or arranging the first set of embeddings after the set of embeddings that represent the selected keywords.

8. The method according to claim 6, wherein: (i) the determining of the second set of embeddings includes determining a weighted sum of the first set of embeddings arranged before the set of embeddings that represent the selected keywords and the first set of embeddings arranged after the set of embeddings that represent the selected keywords, or (ii) the determining of the order includes determining an ordering weight depending on the sentence embedding, determining if the ordering weight meets a condition, and either arranging the first set of embeddings before the set of embeddings that represent the selected keywords when the ordering weight meets the condition, or arranging the first set of embeddings after the set of embeddings that represent the selected keywords otherwise.

9. The method according to claim 8, wherein the determining of the ordering weight includes weighting the sentence embedding with a weighting factor.

10. The method according to claim 1, wherein the providing of the second set of embeddings includes determining the set of embeddings that represent the selected keywords depending on their respective term frequency in a document of the second domain and/or their respective inverse term frequency in a set of documents of the second domain and/or their respective term frequency in a document of the first domain.

11. A device for operating a knowledge base including a language model, wherein the language model is pre-trained for a first domain and includes a tokenizer and a transformer, the device comprising:

at least one processor; and at least one non-transitory storage;

wherein the at least one processor is configured to process instructions that, when executed by the at least one processor, cause the at least one processor to perform the following steps:

providing an input sentence of a second domain;

tokenizing the input sentence with the tokenizer into tokens;

determining, by the transformer, respective embeddings for the individual tokens of the input sentence;

transforming the tokens with the transformer to a sentence embedding representing the input sentence as a whole;

identifying the input sentence as belonging to the second domain;

selecting, based on the identification, a set of keywords of the second domain;

providing a first set of embeddings that includes:

a prompt embedding of the first domain; and the respective embeddings of the individual tokens of the input sentence;

providing a second set of embeddings that includes:

the first set of embeddings; and a set of embeddings that represent the selected keywords of the second domain;

determining, based on the sentence embedding, a respective weight for the first set of embeddings and a respective weight for the second set of embeddings;

blending the first set of embeddings and the second set of embeddings according to the respective weights to determine a blended prompt; and transforming, with the transformer, at least one of the tokens and the blended prompt to an output of the knowledge base;

wherein the at least one storage is configured to store the instructions and the knowledge base.

12. A non-transitory computer-readable medium on which is stored a computer program for operating a knowledge base including a language model that is pre-trained for a first domain, the computer program including computer readable instructions that, when executed by a computer, cause the computer to perform the following steps:

providing an input sentence of a second domain;

tokenizing the input sentence with a tokenizer into tokens;

determining, by a transformer, respective embeddings for the individual tokens of the input sentence;

transforming the tokens with the transformer to a sentence embedding representing the input sentence as a whole;

identifying the input sentence as belonging to the second domain;

selecting, based on the identification, a set of keywords of the second domain;

providing a first set of embeddings that includes:

a prompt embedding of the first domain; and the respective embeddings of the individual tokens of the input sentence;

providing a second set of embeddings that includes:

the first set of embeddings; and a set of embeddings that represent the selected keywords of the second domain;

determining, based on the sentence embedding, a respective weight for the first set of embeddings and a respective weight for the second set of embeddings;

blending the first set of embeddings and the second set of embeddings according to the respective weights to determine a blended prompt; and transforming, with the transformer, at least one of the tokens and the blended prompt to an output of the knowledge base.

* * * * *